United States Patent [19]

Sayles

[11] 4,410,470
[45] Oct. 18, 1983

[54] INCREASING BURNING RATE OF SOLID PROPELLANTS BY ELECTRIC FIELD EFFECTS

[75] Inventor: David C. Sayles, Huntsville, Ala.

[73] Assignee: The United States of America as represented by the Secretary of the Army, Washington, D.C.

[21] Appl. No.: 222,400

[22] Filed: Jan. 7, 1981

[51] Int. Cl.³ ............................................ C06B 21/00
[52] U.S. Cl. ................................ 264/3 R; 149/19.2; 149/19.4; 149/19.9; 149/19.92; 149/76; 149/109.6; 149/113; 149/114
[58] Field of Search ................ 149/19.9, 19.92, 76, 149/109.6, 113, 114, 19.2, 19.4; 264/3 R

[56] References Cited

U.S. PATENT DOCUMENTS

| | | | |
|---|---|---|---|
| 3,158,991 | 12/1964 | D'Alelio | 149/19.9 |
| 3,203,169 | 8/1965 | D'Alelio | 149/19.9 |
| 3,203,170 | 8/1965 | D'Alelio | 149/19.92 |
| 3,389,025 | 6/1968 | Nix et al. | 149/19.1 |
| 3,598,668 | 8/1971 | Sayles | 149/19.92 |
| 3,793,097 | 2/1974 | Lawrence | 149/19.4 X |
| 4,072,546 | 2/1978 | Winer | 149/19.8 |
| 4,097,315 | 6/1978 | Gardner | 149/76 X |

*Primary Examiner*—Leland A. Sebastian
*Attorney, Agent, or Firm*—John H. Raubitschek; Werten F. W. Bellamy; Jack W. Voigt

[57] ABSTRACT

Disclosed is a method for increasing the burning rate of solid propellants which contain metal staples and/or metal flakes, etc., through the use of an electrical field effect created by the application of direct-current to a propellant grain placed between direct-current electrodes. This method also provides a means of correcting for anisotropy of burning rate in propellants which contain metal staples, metal flakes, etc., where non-random orientation may occur at the motor wall and mandrel surface.

2 Claims, 1 Drawing Figure

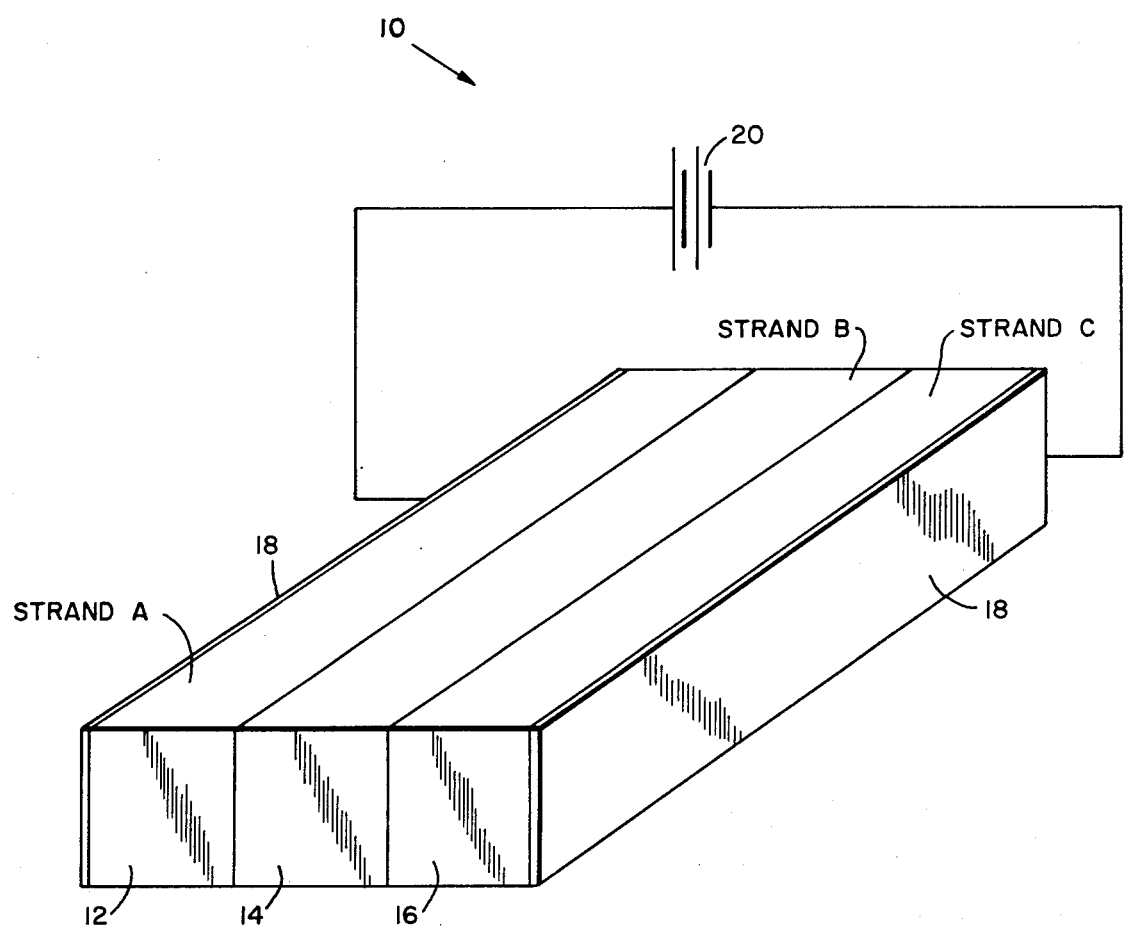

INCREASING BURNING RATE OF SOLID PROPELLANTS BY ELECTRIC FIELD EFFECTS

DEDICATORY CLAUSE

The invention described herein may be manufactured, used, and licensed by or for the Government for governmental purposes without the payment to me of any royalties thereon.

BACKGROUND OF THE INVENTION

The burning rates of solid propellant compositions have been the subject of much research and development works. These research and development works have demonstrated in the field of solid propellants that the burning rates of solid propellant compositions are higher as the particle size of the oxidizer is decreased, especially for the ammonium perchlorate oxidizer systems. This relationship of burning rate to particle size of oxidizer has been demonstrated in all of the binder systems used (double base, polyurethanes, polyesters, rubbers, etc.).

Burning rates of solid propellants have also been increased by incorporating metal staples and/or metal flakes as fuel and burning rate promoters. The fabrication of staples in the form of multi-dimensional crosses is a development to achieve metal staples orientation perpendicular to the burning surface since a certain percentage of the staples would achieve random alignment of staples perpendicular to the burning surface (See U.S. Pat. No. 3,389,025, issued to J. E. Nix et al. on June 18, 1968).

Another approach for staple alignment is disclosed in my U.S. Pat. No. 3,598,668, issued on Aug. 10, 1971. The staples disclosed in this patent are of a composite structure consisting of layers of a propellant fuel metal selected from the propellant fuel metals consisting of aluminum, magnesium, zirconium, boron, and alloys containing major portions thereof and a ferromagnetic metal selected from the group consisting of iron, nickel, cobalt and alloys thereof. These staples are aligned perpendicular to the burning surface by applying a magnetic field to orient the staples perpendicular to the burning surface as the propellant is cast. The propellant is then cured while the staples are oriented to retain the desired orientation.

Metal staples and flakes have been employed extensively in propellant compositions wherein the staple sizes and flake particle sizes and percentages have achieved improved burning rates without particular means for achieving controlled orientation of staples. Additionally, graphite fibers have been employed to achieve improved burning rates as disclosed in U.S. Pat. No. 4,072,546, issued to Richard Winer on Feb. 7, 1978.

Advantageous would be a method to achieve additional burning rate increase in a propellant composition containing metal staples and flakes wherein the effect to improve burning rate is achieved through the use of electrical field effects. This approach to increasing the burning rate would not require a change to the propellant ingredients or formulation which could result in undesired changes to a proven propellant composition.

Therefore an object of this invention is to provide a method of accelerating the burning rates of solid propellants containing metal staples, metal flakes, etc., through the use of electric field effects.

A further object of the invention is to provide a mechanism whereby the burning rate of a propellant which is below the required value can be adjusted to the correct value.

Still a further object of this invention is to provide a means for adjusting the ballistic characteristics of a solid propellant in an all-ready fully-processed propellant grain.

Additionally, another object of this invention is to provide a means of correcting for the anistropy of burning rate in propellants which contain metal staples, metal flakes, etc., where non-random orientation may occur at the motor wall and mandrel surface.

SUMMARY OF THE INVENTION

The burning rate of a composite, hydroxyl-terminated polybutadiene-based propellant containing aluminum flake and aluminum staples is adjusted by applying to the propellant composition direct-current voltages from about 40 volts to about 120 volts for a predetermined time period of several days. The method of this invention was evaluated by placing side-by-side propellant strands ($\frac{1}{4}''\times\frac{1}{4}''\times 2''$) in electrical contact with stainless steel electrodes which were securely held through the use of a securing means, e.g., spring clamps.

BRIEF DESCRIPTION OF THE DRAWING

The FIGURE of the drawing shows an arrangement of test specimens of solid propellant strands in combination with a direct-current source for determining the effect of an electric field on burning rates of solid propellants containing metal fuel and a burning rate promoter selected from metal staples and metal flakes.

DESCRIPTION OF THE PREFERRED EMBODIMENTS

The method of this invention comprises applying to a propellant composition containing metal fuel and a metal burning rate promoter selected from metal staples and metal flakes direct-current voltages from about 40 volts to about 120 volts for a predetermined time period of several days to cause an effect by an electric field which results in an increased burning rate of the propellant.

Table I sets forth a composition of a composite propellant whose burning rate is increased by the method of this invention.

Burning rate strands ($\frac{1}{4}''\times\frac{1}{4}''\times 2''$) of the composite, hydroxyl-terminated polybutadiene-based propellant (Table I) were placed side-by-side between stainless steel electrodes and were held close together through the use of a securing means such as insulated spring clamps to ensure that the direct current flow is directed through the securely held propellant strands. Applied direct-current voltages of 40, 60, 80, and 120 volts were passed through the electrodes for several days. The strands were separated and the change in burning rate was determined (Table II).

TABLE I

COMPOSITION OF COMPOSITE PROPELLANT

| INGREDIENT | WEIGHT PERCENT |
|---|---|
| Ultrafine Ammonium Perchlorate (1.0 mµ) | 57.0 |
| Ammonium Perchlorate (180 mµ) | 18.0 |
| Aluminum Powder (34 mµ) (metal fuel) | 9.0 |
| Aluminum Flake (Alcoa 609) (burning rate promoter) | 2.0 |
| n-Hexylcarborane (burning rate catalyst) | 9.0 |
| Hydroxyl-terminated Polybutadiene (Arco R-45-M) | |

TABLE I-continued
COMPOSITION OF COMPOSITE PROPELLANT

| INGREDIENT | WEIGHT PERCENT |
|---|---|
| BA-114* Trimethylolpropane (crosslinking agent) Triphenylbismuthine (quick cure catalyst) Isophorone Diisocyanate (curing and crosslinking agent) | 5.0 |

*Bonding agent which is the reaction product of equimolar quantities of 12-hydroxylstearic acid and tris(2-methylaziridinyl)phosphine oxide)

Table II sets forth data based on 80 volts direct-current applied to propellant test specimens of the composition set forth in Table I in accordance with the experimental arrangement shown in the FIGURE of the drawing. In further reference to the drawing, the arrangement 10 depicts solid propellant test specimens 12, 14, and 16 (strands A, B, and C) in electrical contact with a pair of electrodes 18 through which a predetermined direct current voltage is applied from a direct-current source 20 for a predetermined time period of from about 2 days to about 8 days to achieve an acceleration of the burning rates as a result of electrical field effects.

TABLE II
EFFECT OF ELECTRIC FIELD* ON BURNING RATE OF PROPELLANT

| TIME (HRS) | CONTROL STRAND | BURNING RATE (IPS @ 2000 PSI) | | |
|---|---|---|---|---|
| | | STRAND A | STRAND B | STRAND C |
| 48 | 10.2 | 10.4 | 10.2 | 10.3 |
| 96 | 10.2 | 10.9 | 10.3 | 10.7 |
| 144 | 10.1 | 11.9 | 10.5 | 11.8 |
| 192 | 10.2 | 12.2 | 12.0 | 12.3 |

*80 VDC

The control propellant strand is prepared from the same composition (of Table I) as employed for propellant strands A, B, and C; however, no direct current voltage was applied to the control strand. As can be seen from the burning rate data obtained in inches per second at 2000 psi, appreciable increases in burning rates of the propellant strands are achieved. The time of applying the voltage was varied from about 2 days to about 8 days.

In further reference to Table II, it is noted that strand A and strand C agree very closely in burning rate increase. This would suggest that about equal electrical field effect was obtained in these strands; however, the burning rate increases of strands A, B, and C approaches about equal value after additional time elapses while voltage is applied. Therefore, the increase in burning rate is proportional to the time that a selected voltage is applied. Thus, the method of this invention provides a means of adjusting the burning rate of a propellant grain to a desired value as predetermined for the direct-voltage selected and the time that the voltage is applied. The method of this invention provides a means for adjusting the ballistic characteristics of a solid propellant in an all-ready fully-processed propellant. The adjusting in accordance with the method of this invention has not been possible before by any means. This method provides a means of correcting for the anisotropy of burning rate in propellants which contain metal staples, flakes, etc where non-random orientation may occur at the motor wall and mandrel surface.

I claim:

1. A method for increasing the burning rate of solid propellants as well as correcting for the anisotropy of burning rate in propellants which contain metal fuel and a metal burning rate promoter selected from metal staples and metal flakes, said method comprising:
   (i) providing a solid propellant composition comprised of a blended oxidizer of ammonium perchlorate of about 180 m$\mu$ particle size and ultrafine ammonium perchlorate of about 1 m$\mu$ particle size, aluminum powder metal fuel, aluminum metal burning rate promoter selected from aluminum staple and aluminum flake, a burning rate catalyst of n-hexylcarborane, and a hydroxylterminated polybutadiene binder which includes the additives of a bonding agent which is the reaction product of equimolar quantities of 12-hydroxylstearic acid and tris(2-methylaziridinyl)phosphine oxide, trimethylolpropane crosslinking agent, triphenylbismuthine quick cure catalyst, and isophorone diisocyanate curing and crosslinking agent;
   (ii) placing said solid propellant composition in electrical contact with electrodes which are connected to a direct current power source;
   (iii) applying a direct-current voltage from about 40 to about 120 volts to said solid propellant composition;
   (iv) allowing said voltage to pass through said solid propellant composition for a predetermined time period from about two days to about eight days; and,
   (v) disconnecting said direct current power source and electrodes from said solid propellant composition, said solid propellant composition characterized by having an increased burning rate as well as a corrected anisotropy of burning rate when compared with a control solid propellant composition having a like composition but to which no direct current voltage was applied.

2. The method of claim 1 wherein said solid propellant composition is comprised of said ultrafine ammonium perchlorate in an amount of about 57.0 weight percent; said ammonium perchlorate in an amount of about 18.0 weight percent; said aluminum powder metal fuel in an amount of 9.0 weight percent with a particle size of about 34 m$\mu$; said aluminum metal burning rate promoter is aluminum flake in an amount of about 2.0 weight percent; said n-hexylcarborane in an amount of about 9.0 weight percent; said hydroxyl-terminated polybutadiene with said additives in an amount of about 5.0 weight percent; and wherein said direct-current voltage is about 80 volts and wherein said voltage is allowed to pass through said solid propellant composition for the predetermined time period of about eight days to yield a solid propellant composition having a burning rate from about 12.2 to about 12.3 inches per second at 2000 psi as compared to a burning rate of about 10.2 inches per second at 2000 psi for said control solid propellant composition having a like composition but to which no direct current voltage was applied.

* * * * *